Feb. 6, 1962   J. J. STRNAD   3,020,096
MASTER COUPLING LINK
Filed Dec. 28, 1959
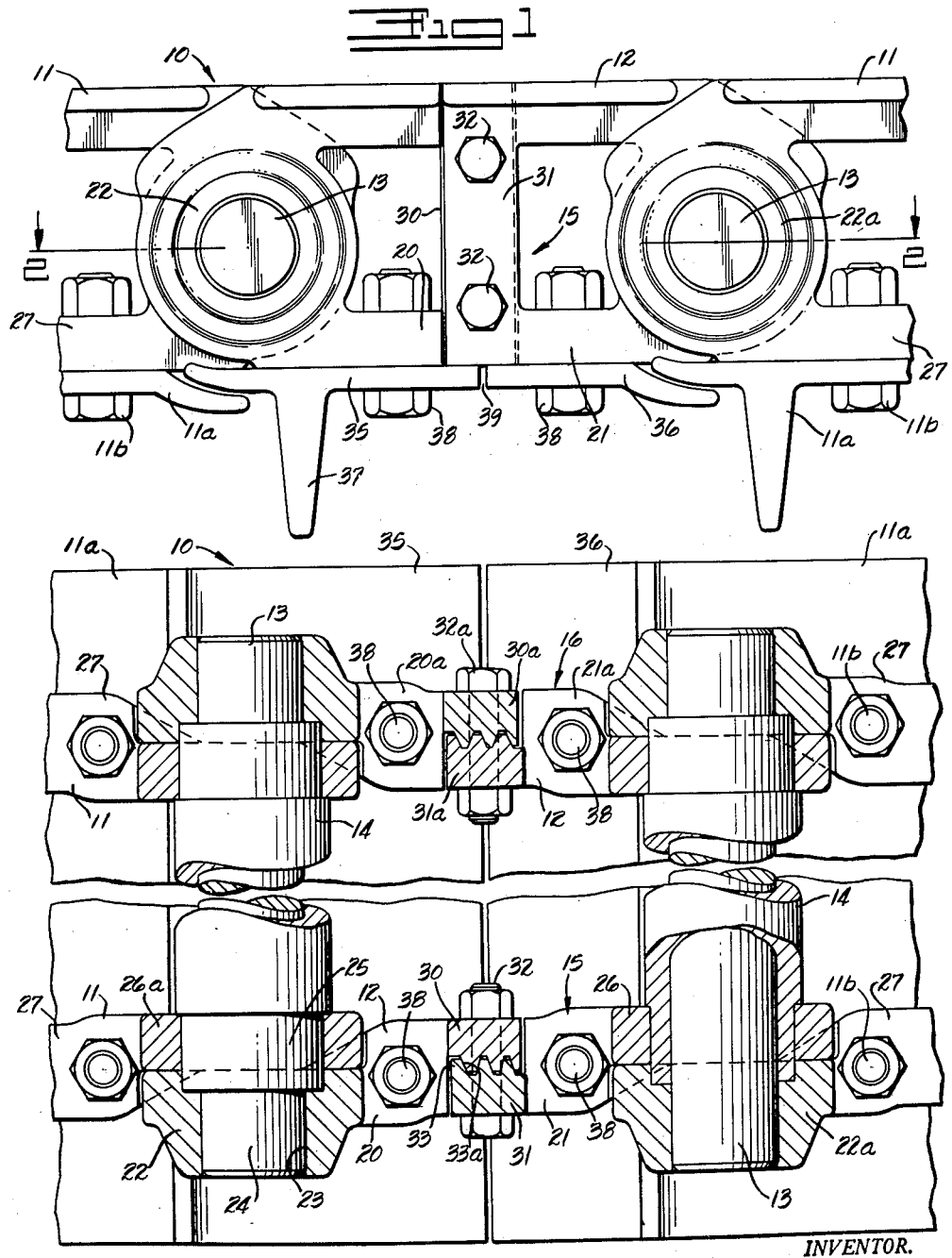
INVENTOR.
JAMES J. STRNAD
BY- MAHONEY, MILLER & RAMBO
BY- W.S. Rambo
ATTORNEYS.

United States Patent Office 3,020,096
Patented Feb. 6, 1962

3,020,096
MASTER COUPLING LINK
James J. Strnad, Bedford, Ohio, assignor to Lempco Products, Inc., Bedford, Ohio, a corporation of Ohio
Filed Dec. 28, 1959, Ser. No. 862,144
1 Claim. (Cl. 305—58)

This invention relates to a master coupling link. It has to do, more particularly, with a master coupling link or a master connecting link for a track of the crawler type used by tractors or other vehicles. The link of this invention is used in connecting the ends of a crawler track in order to provide a continuous crawler track.

The present invention constitutes an improvement over the master coupling link disclosed in the patent to Rund, No. 2,882,102, issued April 14, 1959.

Before the development of the link structure of said patent, the conventional crawler vehicle track consisted of a plurality of parallel aligned pins, each rotatably received in a bushing and extending therefrom at each end. The pins were connected by pairs of links to define a continuous chain. Each link, at one end, was snugly received on a bushing and, at the other end was snugly received on the adjacent pin, so that the links were securely held in position while, at the same time, adjacent links were rotatable in relation to each other to give the track the required flexibility. Grousers consisting of plates carrying ground gripping cleats were connected between the links of each pair to define a crawler track.

In such conventional tracks, it not only is necessary that a master pin assembly be specially constructed to permit disengagement of the links from the pin at each end, but the master pin must be driven out of engagement with the links before the track can be separated. On occasions this can be very difficult, especially when dirt or other matter has worked its way into the opening in the link which snugly receives the pin. Difficulty is also experienced in joining the track for installation, particularly when it is necessary to install the track under an emergency condition.

According to the invention disclosed in Patent No. 2,882,102 a coupling link is provided which eliminates the need for a specially designed master pin assembly. The link can be connected between track pin assemblies which are identical to all the other pin assemblies in the track. Moreover the ends of this coupling link can have the same conformations as the other links to provide shielding for the ends of the bushing and prevent dirt from entering the pin and bushing assembly. This coupling link also permits a quick and easy method of separation of the track without the need of removing any of the track pins.

In the particular structure disclosed in said patent, the coupling link is composed of two separable parts. One part, at one end, is snugly received on one of the bushings of the track. The other part, at one end, is snugly received on the adjacent track pin. The bushing and pin which receive the parts of the link may be similar in every detail to the other bushings and pins of the continuous track. The opposite ends of the two parts of the coupling link have mating surfaces. When a pair of the coupling links are installed to joint the ends of the crawler track, the parts of each coupling link overlap with their mating surfaces in contact. These mating surfaces are detachably secured together by transversely extending removable connecting bolts.

The coupling link structure disclosed in said Patent No. 2,882,102 has been manufactured and used in continuous track for crawler vehicles. It has been found very practical in use in that it has the important advantages discussed above and even additional advantages. However, it has been found that the connection between the two separable parts of the coupling link can be improved and this invention accomplishes the improvement.

According to this invention, improved means is provided for connecting the overlapping ends of the two separable parts of the coupling link. As indicated above, Patent No. 2,882,102 discloses that these overlapping parts are provided with mating planar surfaces which are normally held in engagement by one or more connecting pins or bolts extending transversely through the overlapping ends. According to the present invention, these overlapping mating surfaces are formed with interfitting or interengaging abutments on the surfaces which prevent shear forces from being transmitted to the connecting bolt or bolts. Thus, relative sliding or swinging movements of the mating surfaces are prevented without shearing forces being transmitted to the connecting bolt or bolts. Also, according to this invention, the overlapping parts of the coupling links at the opposed sides of the track are arranged relatively in a special manner to facilitate assembly and disassembly thereof to thereby facilitate coupling and uncoupling of the ends of the track.

In the accompanying drawing, the improved link structure of this invention is illustrated but it is to be understood that this illustrates the preferred form only and that other specific forms may be provided.

In this drawing:

FIGURE 1 is a side elevational view of the master coupling link structure incorporated in a crawler track according to this invention.

FIGURE 2 is a horizontal sectional view taken substantially along line 2—2 of FIGURE 1.

With specific reference to the drawing, this invention is shown applied to a crawler-type track ordinarily used on tractors or similar vehicles, the track being indicated generally by the numeral 10. This track 10 includes double link structures 11 of the conventional type and which may be of the general structure disclosed in Patent No. 2,882,102. These structures 11 carry the usual ground-engaging shoes or grousers 11a removably bolted thereto by the bolts 11b. To connect the ends of the track 10 together to provide a continuous track, a coupling double link structure 12 is provided between the adjacent end link structures 11. All of the link structures 11 and 12 are pivoted or hinged together by means of the standard pins 13 and associated bushings 14 which rotatably receive the pins.

The double coupling link structure 12 is of special construction according to this invention. It includes two parallel laterally spaced link members 15 and 16 of similar construction but as indicated above, they are arranged relatively in a special manner to facilitate assembly and disassembly thereof.

This link member 15 includes the overlapping separable parts 20 and 21. The part 20 has at the outer end thereof the integral eye or collar 22 formed thereon which has a transverse bore 23 extending therethrough. This bore 23 receives, by press-fitting, the outer end 24 of the usual or standard connecting hinge pin 13. At the inner end of this bore 23 it is counterbored to rotatably receive the outer reduced end 25 of the usual or conventional bushing or sleeve 14, it being understood that the pin 13 passes through and is rotatable in this bushing 14. The reduced end 25 of the bushing 14 is press-fitted into the eye 26a which is disposed inwardly of the eye 22 and is formed on the adjacent end of a link member 27 of the usual link structure 11. Thus, the part 20 of the coupling link member 15 is hingedly connected in the usual manner to the adjacent link member 27.

The separable part 21 of the link member 15 is provided at one end with an eye 26 which is like the eye 26a and which is press-fitted over a standard bushing 14 in a similar manner. This eye 26 is disposed inwardly of the eye 22a that is formed on the adjacent end of the link member 27 which is of the conventional form. The standard pin 13 and the standard bushing 14 cooperate with this eye 22a in the usual manner and as described with reference to the link part 20. Thus, the link part 21 of the coupling link member 15 is hingedly connected in the usual manner to the adjacent link member 27.

The inner ends of the respective separable link parts 20 and 21 are provided with relatively interlocking, vertically disposed, integral webs or blocks 30 and 31. These webs 30 and 31 overlap each other and are formed with interfitting and mating surfaces which are normally held in cooperation by the transversely extending connecting and clamping bolts 32 which pass completely through the members 30 and 31. These overlapping mating surfaces are formed with interengaging or interfitting abutments which are indicated as being in the form of alternating vertically extending serrations or ribs 33 and grooves 33a. Each rib 33 on one surface is opposite to a groove 33a on the other surface and is complemental thereto. These serrated surfaces of the members 30 and 31 extend the full height of the respective parts 20 and 21 of the link member 15. Thus, there is an interlocking, interfitting or interengaging structure extending the full height of the link member 15 in the central region thereof, which functions to hold the link parts 20 and 21 against longitudinal separation, and thus relieves the bolts 32 from shear forces which would otherwise be imparted thereto. It will be noted from FIGURE 2 that the member 30 of the link part 20 is inwardly of the member 31 of the link part 21. It will also be noted that the serrated surface on the member 31 of the link part 21 is at the inner side thereof and faces inwardly whereas the serrated surface on the member 30 of the link part 20 is at the outer side thereof and faces outwardly.

As indicated above, the link member 16 is similar to the member 15. It includes the link part 20a and the link part 21a which are similar to the respective parts 20 and 21 of the link member 15, cooperate with each other in a similar manner, and are connected to the respective adjacent link members 27 in the usual manner. The parts 20a and 21a have formed thereon the members 30a and 31a, respectively, which are identical to the members 30 and 31 of the link parts 20 and 21. The serrated surfaces of these members are held in interlocking relationship by the clamping bolts 32a. However, it will be noted that in the link member 16, the position of the members 30a and 31a is reversed as compared to the positions of the members 30 and 31 of the link member 15. Thus, it will be noted that in this link member 16, the member 31a is inwardly of the member 30a, the serrated surface of the member 31a facing outwardly and that of the member 30a facing inwardly.

Thus, the parts 20a and 21a of the link member 16 are similar to the parts 20 and 21 of the link member 15. However, the serrated members thereof are so arranged that those of the members 20 and 20a face in the same direction and those of the members 21 and 21a face in the same direction. Thus, corresponding parts of the link members at opposite sides of the coupling link structure have their serrated surfaces facing in the same direction. This facilitates assembly and disassembly of the coupling link structure.

The double coupling link structure, including the link members 15 and 16 at the opposite sides of the track, may be separated easily by removing the clamping bolts 32 and 32a and laterally disengaging the serrated surfaces on the members 30 and 31 and those on the members 30a and 31a. With reference to FIGURE 2, it will be apparent that this uncoupling can be accomplished by lateral movement of the link parts 20 and 20a as a unit and link parts 21 and 21a as a unit, the units being moved relatively. Obviously, the parts 20 and 20a are connected to one end of the track and the parts 21 and 21a are connected to the other end of the track so that they will move laterally with the ends of the track.

If desired, the double coupling link structure 12 may also include special grousers connected to the opposed link members 15 and 16. These grousers are in the form of separate plates 35 and 36, the plate 35 being provided with the depending cleat 37. The plate 35 is carried by the parts 20 and 20a of the opposed link members 15 and 16 and the plate 36 is carried by the parts 21 and 21a thereof, being bolted thereto by the bolts 38. Thus, when the parts 20 and 21 or the parts 20a and 21a of the opposed coupling link members 15 and 16 are separated, the grouser plates 35 and 36 are separated therewith. The joint 39 between the grouser plates is in substantial alignment with the bolts 32 and 32a. However, if preferred, single grouser plates may be connected to both link parts and be removed before separation of the parts.

It will be apparent that according to this invention, there is provided a coupling link structure which will cooperate effectively with the usual standard link structures provided on tracks of the articulated crawler type. The coupling link structures can be used for coupling the ends of a crawler track together and such track may be composed of the usual standard links and standard connecting pin and bushing structures. The coupling link of this invention is composed of overlapping parts which can be easily separated and reassembled to uncouple or recouple the adjacent ends of the track. Furthermore, when the separable parts of the coupling link are connected, the interfitting mating faces of the overlapping parts provide cooperating abutments which are such that relative movement of such faces is precluded and without subjecting the connecting clamping pins or bolts, which are passed transversely through the overlapping ends of the link member parts, to shearing forces. Thus, the clamping bolts are relieved of shear forces by precluding relative movement of the overlapping ends of the link member in a plane at right angles to that of the axes of the bolts, this movement being precluded by the engaging abutments on the opposed overlapping ends of the link member.

Many advantages of the structure of this invention are discussed above and others will be apparent.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described this invention, what is claimed is:

In a crawler vehicle track; a master coupling link assembly for detachably connecting the ends of such track, comprising a pair of transversely spaced apart link members each composed of two longitudinally extending, relatively separable sections, each section of each link member having an outer end portion defining an eye hingedly connected with an end of said track and an inner end portion including a series of vertically arranged serrations adapted to laterally overlap and interlock with a series of serrations formed on the inner end portion of the other section of said link member, the relatively overlapping inner end portions of the sections of both of said link members being arranged to permit relative separation of the serrations of said sections upon relative lateral displacement of the ends of said track; and fastening means for detachably connecting the relatively separable sections of each of said link members and for holding the serrations of said sections in interlocking engagement.

References Cited in the file of this patent

UNITED STATES PATENTS

| | | |
|---|---|---|
| 2,318,683 | Galanot et al. | May 11, 1943 |
| 2,353,122 | Bigley | July 11, 1944 |
| 2,882,102 | Rund | Apr. 14, 1959 |

FOREIGN PATENTS

| | | |
|---|---|---|
| 344,110 | Germany | Nov. 15, 1921 |